United States Patent

[11] 3,607,891

| [72] | Inventors | Bernard G. Kushlefsky<br>Edison;<br>Gerald H. Reifenberg, Hightstown; William<br>J. Considine, Somerset; Justin L.<br>Hirshman, East Brunswick, all of N.J. |
|---|---|---|
| [21] | Appl. No. | 816,783 |
| [22] | Filed | Apr. 16, 1969 |
| [45] | Patented | Sept. 21, 1971 |
| [73] | Assignee | M&T Chemicals Inc.<br>New York, N.Y.<br>Continuation-in-part of application Ser. No. 773,331, Nov. 4, 1968. |

[54] PROCESS FOR PREPARING TRICYCLOHEXYLTIN HALIDES
13 Claims, No Drawings

[52] U.S. Cl. ................................................ 260/429.7
[51] Int. Cl. ................................................ C07f 7/22
[50] Field of Search ....................................... 260/429.7

[56] References Cited
UNITED STATES PATENTS

| 3,248,411 | 4/1966 | Neumann et al. | 260/429.7 |
| 3,355,468 | 11/1967 | Hirshman et al. | 260/429.7 |
| 3,355,470 | 11/1967 | Natoli | 260/429.7 |
| 3,432,531 | 3/1969 | Natoli | 260/429.7 |

OTHER REFERENCES
Ingham et al., Chemical Reviews, Vol. 60, (1960), pages 486– 487, 260– 429.7

*Primary Examiner*—Tobias E. Levow
*Assistant Examiner*—Werten F. W. Bellamy
*Attorneys*—Lewis C. Brown, Kenneth G. Wheeless and Robert P. Grindle

ABSTRACT: The process of this invention for preparing tricyclohexyltin halide $(C_6H_{11})_3SnX$ wherein X is selected from the group consisting of chloride and bromide comprises a first step of preparing organotricyclohexyltin by reacting as reactants organotin trihalide $RSnX_3$ with cyclohexyl magnesium halide $(C_6H_{11})MgCl$ in an amount of at least three moles of cyclohexyl magnesium halide per mole of organotin trihalide to form said organotricyclohexyltin and a second step of reacting as reactants said organotricyclohexyltin prepared in said first step and tin tetrahalide to produce said tricyclohexyltin halide.

PROCESS FOR PREPARING TRICYCLOHEXYLTIN HALIDES

This invention relates to a novel process for the preparation of organotin compounds. This is a continuation-in-part of application Ser. No. 773,331 filed on Nov. 4, 1968. This invention relates to a novel process for the preparation of organotin compounds. More specifically, this invention relates to a process characterized by improved yield of specific products.

An object of this invention is to provide a process for forming tricyclohexyltin halide without the concomitant formation of other undesirable cyclohexyltins.

The process of this invention for preparing tricyclohexyltin halide $(C_6H_{11})_3SnX$ wherein X is selected from the group consisting of chloride and bromide, comprises a first step of preparing organotricyclohexyltin $(C_6H_{11})_3SnR$ by reacting a reactants organotin trihalide $RSnX_3$ with cyclohexyl magnesium halide $(C_6H_{11})MgX$ in an amount of at least three moles of cyclohexyl magnesium halide per mole of organotin trihalide to form said organotricyclohexyltin and a second step of reacting as reactants said organotricyclohexyltin prepared in said first step and tin tetrahalide to produce said tricyclohexyltin halide.

According to another of its aspects, this invention is a process for preparing a tricyclohexyltin halide $(C_6H_{11})_3SoX$ by the reaction of an organotricyclohexyltin $(C_6H_{11})_3SnR$ with tin tetrahalide $SnX_4$ wherein X is a halide selected from the group consisting of chloride and bromide, comprising reacting as reactants organotricyclohexyltin and tin tetrahalide, thus forming tricyclohexyltin halide.

The tricyclohexyltin product $(C_6H_{11})_3SnX$ which is formed in high yields by practice of this invention may include products wherein the cyclohexyl group, designated $C_6H_{11}$, may be inertly substituted. Typical products which may be formed under the process of this invention, in addition to tricyclohexyltin bromide and tricyclohexyltin chloride, may include: tri-3-methylcyclohexyltin chloride, tri(4-butyl cyclohexyl) tin chloride, tri(3-phenyl cyclohexyl) tin chloride, tri(3, 3, 5-trimethyl cyclohexyl) tin chloride, tri(3, 3, 5-cyclohexyl) tin chloride, tri(3, 5-dimethyl cyclohexyl) tin chloride, tri(4-t-butyl cyclohexyl) tin chloride, tri(4-isopropyl-5-methyl cyclohexyl) tin chloride, tri(3, 5-dimethyl cyclohexyl) tin chloride, tri(3, 4-dimethyl cyclohexyl) tin chloride, together with the corresponding bromide derivatives.

The tin tetrahalide which may be used in the practice of this invention may be $SnX_4$, wherein X is an active halide selected from the group consisting of chloride and bromide. Preferably, $SnX_4$ may be tin tetrachloride, $SnCl_4$.

The practice of this invention comprises the preparation of organotricyclohexyltin by the reaction of the organotin halide product of the first step with cyclohexyl magnesium halide in the amount of at least three moles per mole of organotin trihalide. The exact ratio of Grignard reagent to phenyltin trihalide is not critical. To minimize the concomitant formation of undesirable cyclohexyltins an excess of Grignard reagent is desirable.

In the practice of this invention the reaction between the organotin trihalide and cyclohexyl magnesium halide may be as follows:

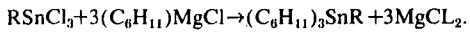

As noted above, the molar ratio of cyclohexyl magnesium halide to organotin trihalide is not critical except that to obtain the high yields of this invention at least three moles of cyclohexyl magnesium halide should be used per mole of organotin trihalide. Preferably, the exothermic reaction mixture of the second step may be maintained at a temperature of 25° C to 95° C, preferably less than 80° C. The reaction time may be varied from 60 minutes to 150 minutes. The organotricyclohexyltin product may be recovered by conventional means, e.g. extraction or distillation.

The high boiling inert hydrocarbon solvent such as xylene or toluene may be added and the ether removed before the organotin trihalide is added. In this way, a mixture is produced which is comparatively easy to handle. If the process is carried out by adding high boiling inert hydrocarbon and organotin trihalide to the ether solution and subsequently distilling out the ether to permit the reaction to be conducted at high temperature, there results a viscous mixture which is hard to handle.

In the reactant $RSnX_3$, R may be a hydrocarbon radical preferably selected from the group consisting of alkyl, alkenyl, cycloalkyl, aralkyl, aryl, alkaryl, including such radical when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about 8 carbon atoms, i.e. octyls and lower. When R is alkenyl, it may typically be vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadencyl, etc. When R is cycloalkyl, it may typically be cyclopentyl, cyclohexyl, cycloheptyl, cyclooctyl, etc. When R is aralkyl, it may typically be benzyl, β-phenylethyl, ν-phenypropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted, e.g. may bear a nonreactive substituents such a alkyl, aryl, cycloalkyl, aralkyl, alkaryl, alkenyl, ether, etc. Typical substituted alkyls include 2-ethoxyethyl, etc. Substituted alkenyls include ν-phenylpropenyl, etc. Substituted cycloalkls include 4-methylcyclohexyl, etc. Inertly substituted aryl includes chlorophenyl, anisyl, biphenyl, etc. Inertly substituted aralkyl includes chlorobenzyl, p-phenylbenzyl, p-methylbanzyl, etc. Inertly substituted alkaryl includes 3-chloro-5- methylphenyl, 2, 6-ditert-butyl-4-cholorphenyl, etc.

The Grignard reagent used in the practice of the process of this invention, cyclohexyl magnesium halide, including Grignard reagents containing inertly substituted cyclohexyl radicals noted above, may be prepared by the reaction of a cyclohexyl halide with magnesium a according to the following reaction:

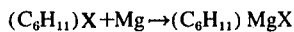

This reaction is preferably carried out under an inert atmosphere, e.g. nitrogen gas, in the presence of an aliphatic ether such as diethyl ether, di-n-butyl ether, etc. or in the presence of a cyclic ether. Various initiators may be present to facilitate the formation of the Grignard reagent. The Grignard reagent may be in the form of a solution of its complex with a n ether.

The reaction mixture may be then hydrolyzed to isolate the intermediate organotricyclohexyltin, typically this may be effected by adding an aqueous solution of citric acid, resulting in a two-phase system. The organic layer of the two-phase system may be separated by decantation. The organic layer may be stripped of solvent by distillation. The distillation may be effected at atmospheric pressure.

In the practice of the second step of this invention, the preparation of tricyclohexyltin halide, the reaction of organotricyclohexyltin and tin tetrahalide in a substantially unimolar ratio may be as follows:

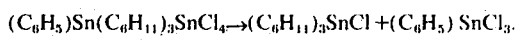

The reaction temperature of this process ranges from 0° to 120° C. The time reaction ranges from 30 minutes to 90minutes.

The organotricyclohexyltin may be added in the form of a solution. Typical solvents include xylene, heptene, hexene, etc. The reaction medium at any given time may be considered as having been formed by mixing reactants in equivalent molar proportions.

The reaction mixture, after being refluxed, generally consists of two phases. The solvent may be removed from the upper phase by distillation. The product tricyclohexyltin halide may be removed from the distillate by filtration.

Practice of this invention may be observed by reference to the following example in which the process of this invention has been applied, but it is not to be construed as limiting the broader aspects of this invention.

EXAMPLE 1

In the preparation of phenyltin trichloride a 5-liter three-necked flask equipped with an air motor, stirrer, water condenser, thermometer drying tube, and nitrogen inlet tube was charged with 2,135.5 grams (5.0 moles) of tetraphenyltin. 3,907.5 grams (15.0 moles) moles) of the tetrachloride was rapidly added. The reaction mixture was heated to 200° C. and maintained at this temperature for two hours. The mixture was filtered and after which time the filtrate was separated. An insoluble filtered cake was discarded. The filtrate was distilled to yield a phenyltin trichloride product exhibiting a weight of 5,423 grams, boiling point range of 84°–91° C. (0.5–0.7m m./Hg), and an index of refraction 1.5836 to 1.5868.

In the practice of the first step, the preparation of tricyclohexylphenyltin, the Grignard reagent was prepared by adding 62.0 grams (2.55 moles) of magnesium turnings to a reaction vessel which was purged with nitrogen gas. 100 milliliters of tetrahydrofuran were added with an initiation mixture containing 6.0 grams (0.5 moles) of cyclohexyl chloride and 4.3 grams (0.5 mole) of cyclohexyl bromide. To the reaction mixture there was slowly added a mixture containing 289.9 grams (2.43 moles) of cyclohexyl chloride and 1,350 milliliters of tetrahydrofuran. At the end of the addition, the reaction was allowed to proceed exothermically for 2 hours, and then cooled to 40° C. A charge solution containing 202.0 grams (0.67 mole) of phenyltin trichloride, prepared supra in 600 milliliters of benzene was added to the reaction mixture over a 30-minute time increment. The reaction mixture was maintained at a general reflux for 150 minutes after which time the reaction mixture was cooled to room temperature and hydrolyzed with an aqueous solution with 120grams of citric acid in 1,200 milliliter of water. The reaction mixture was then separated into two phase system, which system was filtered to remove undissolved magnesium metal. The filtrate was transferred to separatory funnel, the aqueous layer was separated and extracted with 1,350 milliliters of benzene. The solvent was removed by distillation and 195 grams of tricyclohexylphenyltin, a 66 percent yield, exhibiting a melting point range of 188.5° C. –192° C. was obtained.

In the second step the preparation of tricyclohexyltin chloride, a solution of 26.8 grams (0.06 mole) of tricylohexylphenyltin, prepared above in 40 milliliters of xylene was charged to reaction vessel. The solution was cooled to -20° D. by placing the reaction vessel in an ice-methanol bath. A solution of 15.7 grams (0.06 mole) of tin tetrachloride in 10 milliliters of xylene were radially added. The reaction mixture was refluxed for 30 minutes and then cooled to room temperature, water is added and the reaction agitated at which point the reaction mixture consisted of two phases, an agueous lower phase and a upper-phase. The phases were separated and the solvent removed from the upper phase by distillation to obtain a crystalline mass. The white crystals were separated from the liquid by filtration. The white crystals were separated from the liquid by filtration. The white crystals, tricyclohexyltin chloride, after washing with methanol, exhibited a weight of 20.0 grams and a melting point of 124°–125° C. Vapor phase chromatographic analysis showed the tricyclohexyltin chloride to be 98 percent pure.

EXAMPLE 2

The process of example 1 was followed in the preparation of 1.93 moles (1,330milliliters) of tricyclohexyl magnesium chloride Grignard reagent. To the Grignard reagent in 250milliliters of pentante was added 200.4 grams (0.71mole) of butyltin trichloride. At the end of the addition, the reaction was allowed to proceed exothermically for an additional two hours.

The resulting crude intermediate tricyclohexylbutyltin was washed with 25 millimeters of a 5 percent by weight, solution of hydrochloric acid in water and separated. The intermediate product, tricyclohexylbutyltin, when washed with ethonal exhibited a weight of 199.6 grams.

The preparation of tricyclohexyltin chloride was effected by forming a solution of 42.4 grams 0.01 mole) of tricyclohexylbutyltin in 50 millimeters of benzene. Thereafter a solution of 26.0 grams (0.1 mole) of tin tetrachloride ($SnCL_4$) in 50 milliliters of benzene was added dropwise during a time increment of 45 minutes. The reaction mixture was cooled, water added then separated into two phases. The phases were separated and the butyltin trichloride extracted with a solution of 10 percent hydrochloric acid in water. The product, tricyclohexyltin chloride, after washing and filtration exhibited a weight of 39.1 grams and a melting point of 124.5° to 126° C. Although this invention has been illustrated by reference to specific examples, changes therein which clearly fall within the scope of the invention will be apparent to those skilled in the art. It is therefore to be limited solely by the scope of the appended claims.

We claim:

1. A process for preparing tricyclohexyltin halide $(C_6H_{11})_s$ SnK wherein X is selected from the group consisting of chloride and bromide, comprising a first step of preparing organotricyclohexyltin by reaction as reactants organotin trihalide $RSnX_3$ wherein R is a member selected from the group consisting of alkyl having one to eight carbon atoms; vinyl; allyl; tolyl; xylyl; enbzyl; chororphenyl and phenyl. with cyclohexyl magnesium halide $(C_6H_{11})MgX$ in an amount of at least three moles of cyclohexyl magnesium halide per mole of organtoin trihalide to form organotricyclohexytlin and a second step of reacting as reactants said organotricyclohexyltin prepared in said first step and tin tetrahalide in a substantially unimolar ration to produce said tricyclohexyltin halide.

2. The process of claim 1 wherein said tricylclohexyltin halide is tricyclohexyltin chloride.

3. The process of claim 1 wherein at least a portion of said organotin trihalide reactant of said first step of claim 1 is a byproduct organotin trihalide of said second step claim 1.

4. The process of claim 1 wherein said organotin trihalide is butyltin trihaldie.

5. The process of claim 1 wherein said organotin trihalide is phenyltin trihalide.

6. A process for preparing a tricyclohexyltin halide $(C_6H_{11})_3$ SnX by the reaction of organotricyclohexyltin $(C_6H_{11})_3SnR$ with tin tetrahalide $SnX_4$ wherein X is a halogen selected from the group consisting of chloride and bromide, comprising reacting as reactants organotricyclohexyltin and tin tetrahalide, thus forming said tricyclohexyltin halide.

7. A process for preparing a tricyclohexyltin halide $(C_6H_{11})_3$ SnX by the reaction of organotricyclohexyltin $(C_6H_{11})_3SnR$ and a tin tetrahalide $SnX_4$ wherein X is a halide selected from the group consisting of chloride and bromide comprising maintaining a reaction mixture containing $SnX_4$ adding to said reaction mixture $(C_6H_{11})_3SnR$ in an amount of at least three moles per mole of $SnX_4$ and agitating said reaction mixture during said addition whereby said reaction mixture is maintained substantially uniform thereby forming $(C_6H_{11})_3SnX$.

8. The process of claim 7 wherein said tin tetrahalide is present in an amount of 1±0.1 mole per mole of organotricyclohexyltin.

9. The process of claim 7 wherein said reaction is carried out at a temperature of 0° C. to 120° C.

10 The process of claim 7 wherein said organotricyclohexyltin is an alkyltricyclohexyltin.

11. The process of claim 7 wherein said organotricyclohexyltin is tricyclohexylbutyltin.

12. The process of claim 7 wherein said organotricyclohexyltin is aryltricyclohexyltin.

13. The process of claim 7 wherein said organotricyclohexyltin is tricyclohexylphenyltin.

UNITED STATES PATENT OFFICE
CERTIFICATE OF CORRECTION

Patent No. 3,607,891　　　　　　Dated 9/21/71

Inventor(s) Bernard G. Kushlefsky et al.

It is certified that error appears in the above-identified patent and that said Letters Patent are hereby corrected as shown below:

Column 3, lines 65-66, delete "The white crystals were separated from the liquid by filtration". (second occurrence).

Column 3, line 76, for "pentante" read --pentane--.

Column 4, line 5, for "millimeters" read --milliliters--.

Column 4, line 7, for "ethonal" read --ethanol--.

Column 4, line 10, following "grams" insert --(--.

Column 4, line 11, for "millimeters" read --milliliters--.

Signed and sealed this 4th day of April 1972.

(SEAL)
Attest:

EDWARD M. FLETCHER, JR.　　　　ROBERT GOTTSCHALK
Attesting Officer　　　　　　　　Commissioner of Patents

- SHEET 2 -

UNITED STATES PATENT OFFICE
CERTIFICATE OF CORRECTION

Patent No. 3,607,891          Dated September 21, 1971

Inventor(s)    Bernard G. Kushlefsky et al.

It is certified that error appears in the above-identified patent and that said Letters Patent are hereby corrected as shown below:

Claim 1, line 2, for "K" read --X--.

Claim 1, line 7, for "enbzyl" read --benzyl--.

Claim 1, line 10, for "organtoin" read --organotin--.

Claim 1, line 13, for "ration" read --ratio--.

Column 1, line 3, "This invention relates to a novel process for the preparation of organotin compounds." should begin a new paragraph;

Column 1, line 25, for "$(C_6H_{11})_3SoX$" read --$(C_6H_{11})_3SnX$--.

Column 2, line 37, for "cholorphenyl" read --chlorophenyl--.

Column 2, line 43, delete "a".

Column 3, line 16, delete "moles)" at second occurrence.

Column 3, line 46, following "to" insert --a--.

Column 3, line 54, for "-20°D." read -- -20°C.--.

Column 3, line 57, for "radially" read --rapidly--.

Column 3, line 61, for "agueous" read --aqueous--.